Figure 1:
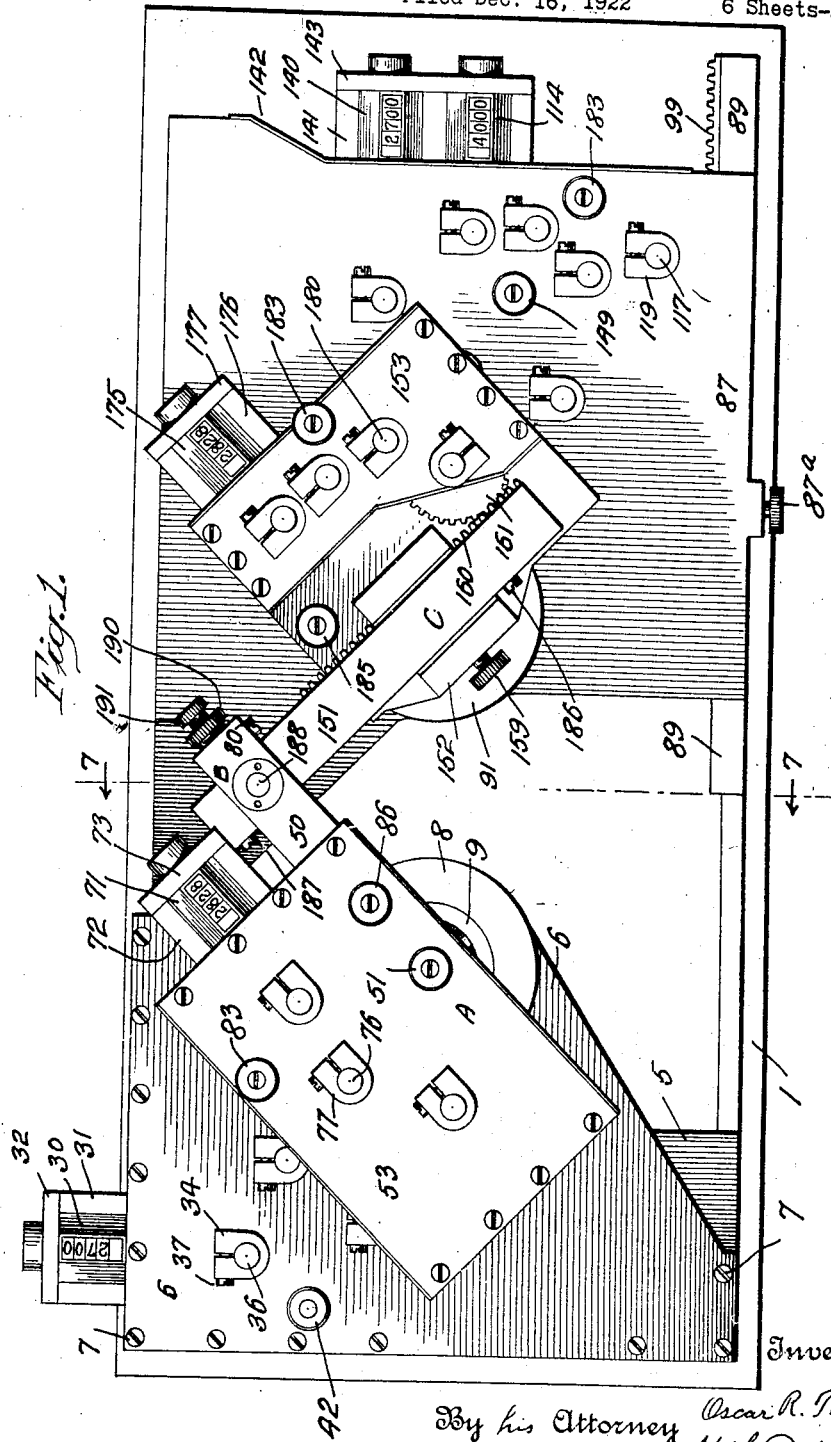

March 17, 1925.

O. R. TURNER 1,529,817

TRIANGLE CALCULATING INSTRUMENT

Filed Dec. 16, 1922   6 Sheets-Sheet 1

Inventor
Oscar R. Turner
By his Attorney
M. H. Lockwood

March 17, 1925.

O. R. TURNER 1,529,817

TRIANGLE CALCULATING INSTRUMENT

Filed Dec. 16, 1922

6 Sheets-Sheet 2

Inventor
Oscar R. Turner
By his Attorney
N. H. Lockwood

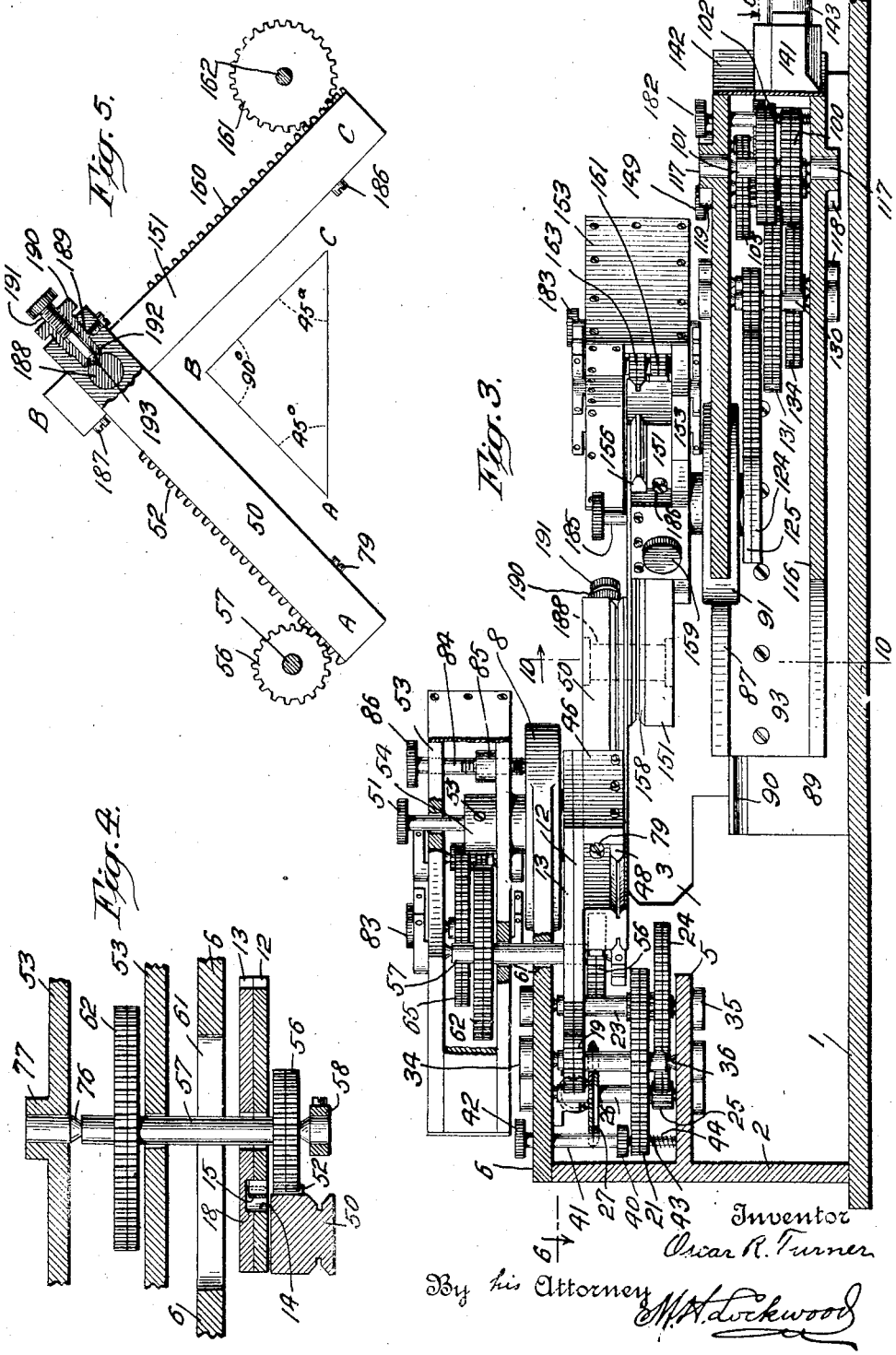

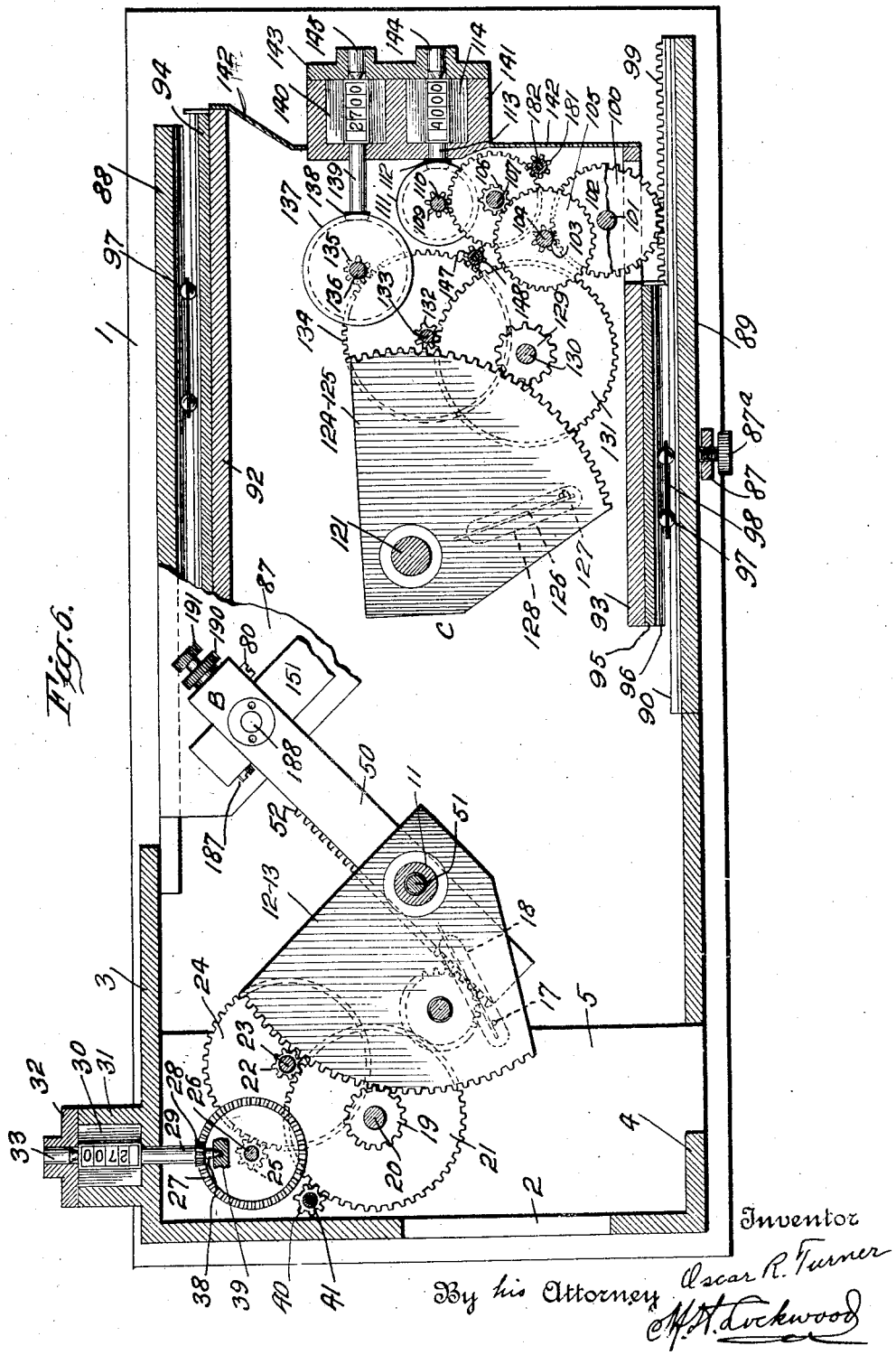

March 17, 1925.  1,529,817
O. R. TURNER
TRIANGLE CALCULATING INSTRUMENT
Filed Dec. 16, 1922    6 Sheets-Sheet 5
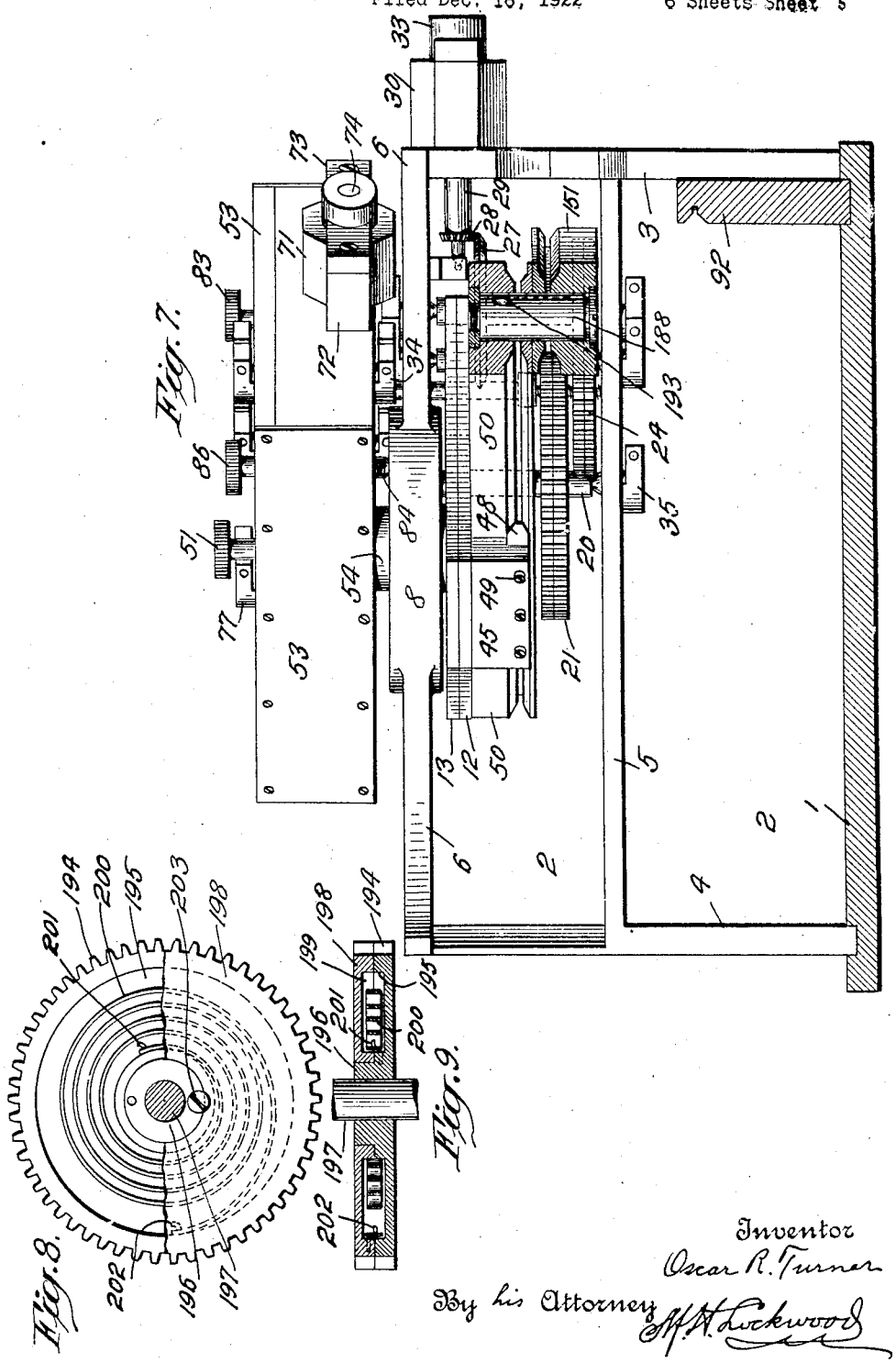
Inventor
Oscar R. Turner
By his Attorney

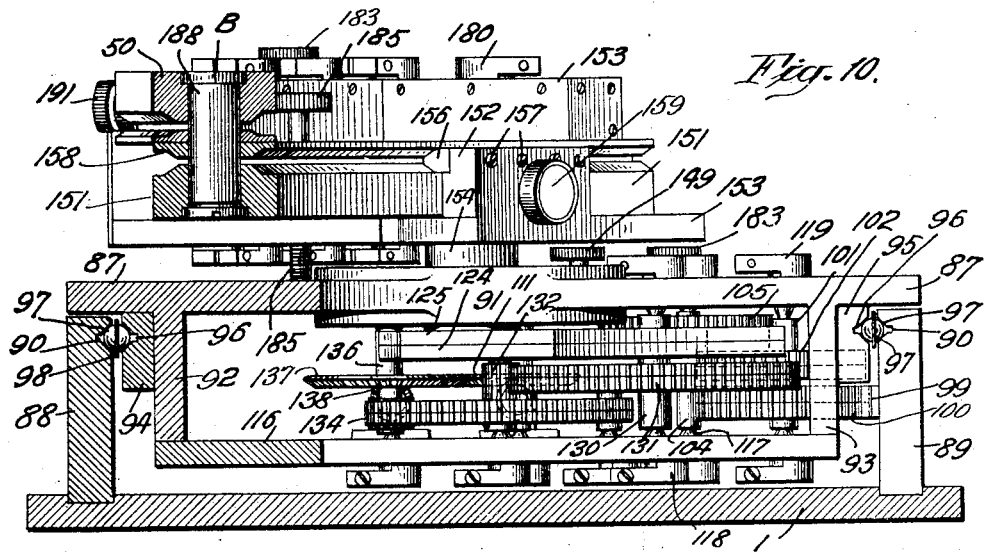
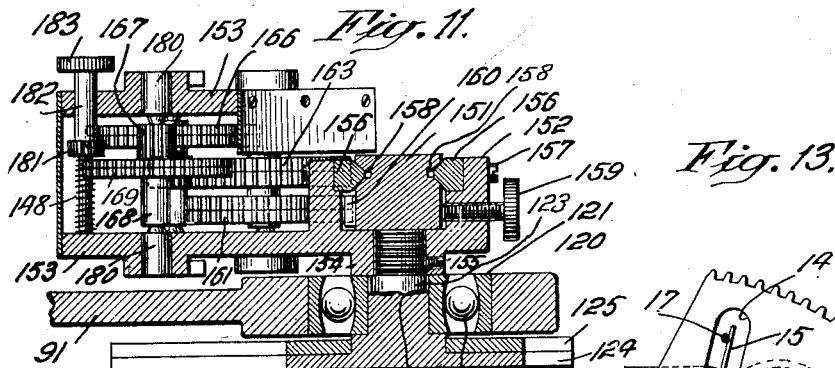
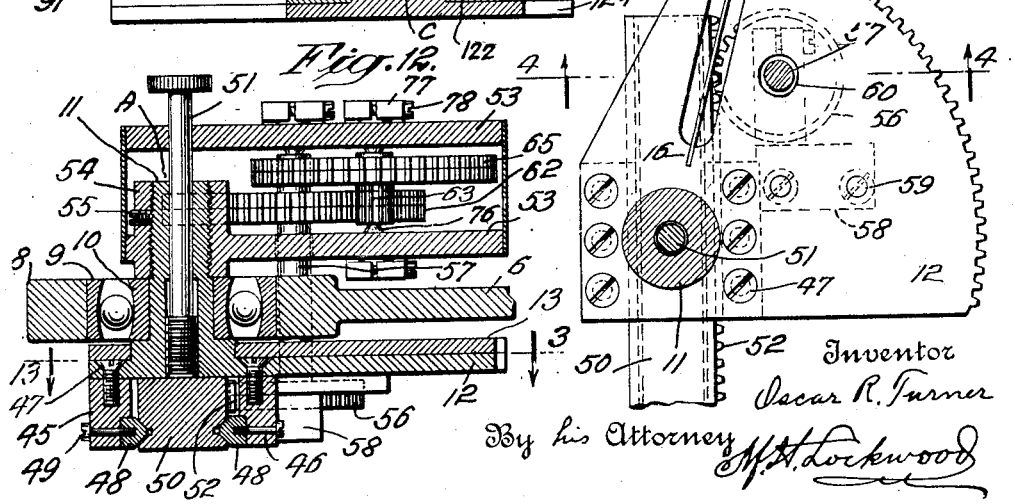

Patented Mar. 17, 1925.

1,529,817

UNITED STATES PATENT OFFICE.

OSCAR R. TURNER, OF SALT LAKE CITY, UTAH.

TRIANGLE-CALCULATING INSTRUMENT.

Application filed December 16, 1922. Serial No. 607,298.

*To all whom it may concern:*

Be it known that I, OSCAR R. TURNER, a citizen of the United States, and resident of Salt Lake City, county of Salt Lake, and State of Utah, have invented certain new and useful Improvements in Triangle-Calculating Instruments, of which the following is a specification.

My improvement relates more particularly to an instrument of this character adapted for the solution of various triangles and comprises various novel improvements over the form of instrument shown and described in my pending application, Ser. No. 445,501, filed April 18, 1922.

It is well known that civil and mining engineers, surveyors, architects, bridge builders, and other technical men are continuously required to ascertain and determine different lengths and measurements by the solution of triangles. Ordinarily, this is done either in the office or in the field by means of trigonometric functions and logarithmic tables, but this is a slow and tedious process, particularly as it is nearly always necessary to go over and repeatedly check the calculations.

Instruments of various kinds have been devised to facilitate the solution of triangles, but most of these are crude and inaccurate and require so much care in the setting and reading thereof that there is not much gain in time, and the reliability of the results is not always satisfactory. I have made a particular study of this problem and have devised various types of instruments adapted for the solution of triangles and my effort has been toward devising instruments not only of greater accuracy, but capable of rapid setting and direct reading of the various sides and angles, thereby increasing the speed of operation and making it possible for those comparatively unskilled to readily operate the instrument and satisfactorily solve triangles.

It is well known that if three elements of a triangle are known, the other three can be determined, that is, if two angles and one side are given, or two sides and one angle, the remaining elements of the triangle can be readily determined by calculation. With my improved triangle calculating instrument, however, such triangles can be solved mechanically and the unknown sides and angles read off immediately, after the known elements have been properly set up on the instrument.

Therefore, the principal object of my improved triangle calculating instrument is to provide direct reading registering means associated respectively with adjustable means representing the three sides of the triangle and means representing two angles thereof. It will be understood that with two angles of a triangle given or known, the other angle will also be known, for the sum of the three angles of the triangle is always equal to 180°. Moreover, where distances and measurements, as in surveying, have to be determined by triangulation, and the unknown elements of the triangle determined by calculation, it is customary, when possible, to use right angled triangles, as the solution thereof requires much less work and calculation.

A further object in my improved instrument, therefore, is to provide means for locking the beam arms, representing two sides of the triangle, together at an angle of 90°, thereby facilitating the rapid determination of the other unknown quantities, when an additional angle and one side are known. When surveying in mountainous or hilly regions, it is customary to measure the lengths along the ground, up and down the inclines, and take the angle of each measurement, hence the correct horizontal distance will be one side of a right triangle of which the distance measured is the hypothenuse. Therefore, the number of right angled triangles that require solution in mapping the survey is extremely large and those who have had to work out thousands of such triangles by calculations and the use of tables, can readily appreciate the vast saving in time and effort made possible by the use of a direct reading instrument.

In operating instruments of this character, it will be readily understood that, where the motion of the gearing leading up to or operating the registering mechanism is multiplied several hundred times, care must be taken to eliminate lost motion or backlash in the gears, in order that accurate readings may be obtained. In order that this may be satisfactorily obtained, a further object of my improvement is to provide split backlash gears alternating with solid faced gears or pinions, the tension between split gears being so adjusted that excessive friction will be avoided and yet the gears will be capable of carrying the load in either direction of movement of the gears.

Furthermore, in my improved instrument, which is provided with a plurality of registering mechanisms in which the gear ratios are such as to multiply the motion several hundred times, it will be obvious that during the setting of the instrument, the final gears will be rotated at very high speed.

Since accuracy in the final setting of the instrument is required, a further object of my improvement is to provide a slow moving setting device, such as a pinion, which may be brought into engagement with one of the gears of the train and rotated by hand, so as to give the final and close adjustment that may be required.

Figure 2:
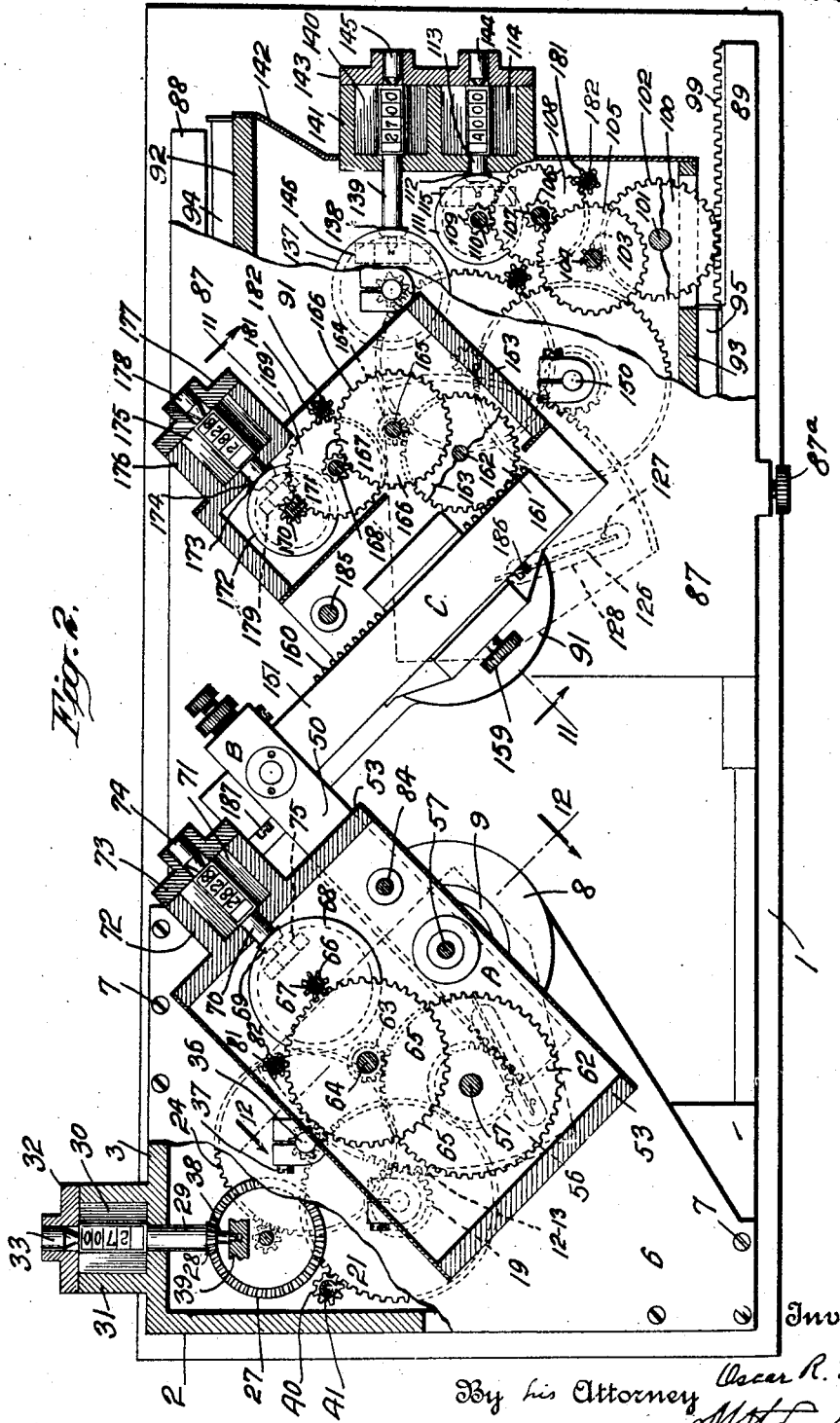

The practical carrying out of these and other objects will be found in the particular form of my improved triangle calculating instrument, as shown in the accompanying drawings, of which Fig. 1 is a plan view of the instrument; Fig. 2 is a substantially similar plan view, with portions of the top casings removed or broken away to disclose the mechanism; Fig. 3 is a front elevation, in section, the front walls of the instrument being cut away; Fig. 4 is a sectional detail on the line 4—4 of Fig. 13; Fig. 5 is a detail of the beam arms representing two sides of the triangle, the joint being shown in section; Fig. 6 is a top plan view, in which most of the superstructure of the instrument is removed, so as to show details of the two gear segments or quadrants and the angle register means; Fig. 7 is a transverse section, in elevation, on the line 7—7 of Fig. 1, looking toward the left; Fig. 8 is a plan view, partially in section of one of the split backlash gears, used in the registering mechanism gear train; Fig. 9 is a transverse section of the split gear shown in Fig. 8; Fig. 10 is a sectional view, in elevation, on the line 10—10 of Fig. 3, looking toward the right; Fig. 11 is a vertical section through the pivot and slide block mounted on the carriage, the section being on the line 11—11 of Fig. 2; Fig. 12 is a similar section through the other slide block pivot on the line 12—12 of Fig. 2 and Fig. 13 is a plan view, showing details of the gear segment, the section being taken on the line 13—13 of Fig. 12.

Referring to the drawings, it will be seen that my improved instrument comprises the various mechanisms mounted in compact form, upon a base member or plate 1, which is provided with a wall or casing 2 at the left side thereof, as seen in Fig. 3 of the drawings, and partial enclosing walls 3 and 4, which are connected by a transversely extending shelf or plate 5, as will be seen more particularly in Figs. 3 and 7 of the drawings. An overhanging bracket is mounted upon the top of the walls 2, 3 and 4 and secured thereto by screws 7, as will be seen in Fig. 1. The bracket plate 6 is thickened at 8 and bored out to provide a pivot bearing for the angle A of the triangle. For the purpose of illustration and reference, a triangle with the angles lettered A, B and C is shown in Fig. 5 of the drawings.

The pivot A is more particularly shown in the section in Fig. 12 of the drawings, and it will be seen that the outer shell 9 of an annular ball bearing is forced into the bore in the thickened portion 8 of the plate 6, and the inner annular member 10 is forced on the hub 11, extending upward from a gear segment or quadrant 12, located below the bracket plate 6 and extending toward the left, as seen in Fig. 6 of the drawings. The gear segment 12 is preferably split and provided with a second similar segment 13 loosely mounted thereon and adapted for a limited amount of angular movement relative to the segment 12, so as to form therewith a backlash gear. As will be seen in Fig. 13 of the drawings, the segment 12 is provided with a radial slot at 14, in which a leaf spring 15 is mounted, one end of the spring being secured in a slot 16, near the hub 11, while the free end of the spring is adapted to engage a pin 17, depending from the underside of the relatively movable portion 13 of the segment, which may be provided with a suitable concave recess at 18 to accommodate the spring 15. The tension of the spring 15 is sufficient to carry the load but not enough to interfere with the smooth operation of the gears.

As will be seen more particularly in Figs. 3 and 6, the split segment 12—13 engages a pinion 19, secured upon a shaft 20, which also carries a gear 21. The gear 21 operates in pinion 22 on the shaft 23, which also carries a gear 24. The gear 24 engages a pinion 25 on the shaft 26, the latter also carrying a bevel gear 27 meshing with a bevel pinion 28 on the end of a shaft 29, as more particularly shown in Fig. 6 of the drawings. The shaft 29 of the bevel pinion 28 is operatively connected to a registering or counting device 30, which may be mounted in any suitable manner upon the wall 3 of the casing of the machine, as shown in Figs. 6 and 7 of the drawings. In the present instance, the wall plate 3 is provided with a boss 31, which is bored out to receive the register mechanism 30 and the latter is held in place by a cap 32, which is provided with a central thrust bearing at 33.

The registering mechanism indicated at 30 and the other similar registering devices shown in the present machine may be of any well known construction, in which suitable numeral wheels, rotatably mounted are provided and suitable tens transferring devices are incorporated therewith, so that when the units wheel is rotated one complete rotation, the adjoining wheel will be correspondingly advanced one place to represent the carrying of the tens. Such counting devices are well known on the market, those used in the present instrument are the well known Veeder counters, and need no particular description here. It will be understood, however, that any suitable registering device may be employed for the purpose. Movement of the segment 12—13, rotatably mounted as described, is adapted to give a direct reading of the angle A of the triangle on the register 30, and it will be understood that the intermediate gearing between the segment 12—13 and the register 30 may be given any desired ratios so as to multiply the motion of the segment 12—13 as may be required. In the present instrument, however, it is preferred that the registering device be of the ordinary denominational type and show the angle in minutes, rather in degrees and minutes. This may be accomplished by making the segment 12—13 a quadrant from a gear of 150 teeth and 30 pitch; the pinion 19, with which it meshes of 30 pitch and 22 teeth; the gear 21 of 48 pitch and 108 teeth; the pinion 22 of 48 pitch and 12 teeth; the gear 24 of 48 pitch and 99 teeth; the pinion 25 of 48 pitch and 12 teeth; the bevel gear 27 with 64 teeth and the bevel pinion 28 with 15 teeth. The counting device or register 30 is so connected that for one complete rotation of the shaft 29, the units wheel will pass over ten units or spaces, representing ten minutes of the angle A.

As will be seen in Figs. 2, 3 and 6 of the drawings, the intermediate gearing between the segment 12—13 and the register 30 is mounted in a gear box or casing formed between the shelf 5 and the bracket cover plate 6. Upon the shelf 5 and bracket plate 6, in the present instrument, a plurality of suitable split bosses 34 and 35 are provided and each is bored out and fitted with a cone bearing 36, which may be adjusted into cone sockets in the respective ends of the shafts 20, 23 and 26, for pivoting the same, after which the cone bearings may be secured in adjusted position by suitable screws 27, passing through the split portions of the bosses, as indicated in Fig. 2 of the drawings. In the present instrument it has been found desirable to support the inner end 38 of the bevel pinion shaft 29, so as to prevent the shaft from wobbling and this is preferably done by making the end 38 cone shaped and supporting it in a cone bearing in a block 39 depending from the under-side of the plate 6 or supported in any other suitable way. It will be understood that, with the multiplying gearing between the segment 12—13 and the register mechanism 30, when the angle A is adjusted by rotating the segment, the speed of rotation of the shaft of units wheel in the registering mechanism will be very high and hence it may be difficult to see the numerals and adjust the angle by direct manipulation of the segment and therefore, it is preferable to provide means for fine adjustment or slow movement of the parts.

In the gear train just described, this is preferably accomplished by mounting a pinion 40 on the lower end of a shaft or rod 41, the upper end of which extends through the cover or bracket plate 6 and is provided with a knurled head 42, as shown in Fig. 3 of the drawings. The rod or shaft 41 may be turned of smaller diameter at its lower end 43, below the pinion 40, and enters a hole in the shelf 5. A suitable spring, such as a coiled spring 44 surrounding the shaft, may be provided, as indicated in Fig. 3 of the drawings, to normally hold the pinion 40 out of engagement with the gear 21. When, however, it is desired to set the angle accurately, by slow motion, the knurled head 42 may be pushed downward so that the pinion 40 will engage the teeth of the gear 21 and the latter may be rotated in either direction by rotating the knurled head 42. When the adjustment is completed and the pressure is removed from the knurled head 42, the spring 44 will disengage the pinion 40 and restore the parts to the position shown in Fig. 3. When the angle A has been properly set by rotating the gear segment 12—13, the proper amount, the latter together with the associated parts may be clamped or locked in adjusted position by any suitable means, such as the well known annular clamping device, used on transit instruments or a suitable set screw, as will be more particularly pointed out hereinafter.

The object of the angle measuring and registering device just described is to measure the angle A between the base line A—C and the side A—B of the triangle, and, therefore, it is desirable in an instrument of this character to represent and measure the side A—B. For this purpose a beam arm representing the side A—B is mounted in a slide block, comprising blocks 45 and 46, mounted on the underside of the quadrant gear segment 12 and secured thereto by suitable screws 47, as shown in Fig. 12 of the drawings. Gibs 48 are secured to the respective blocks 45 and 46, by screws 49, the inner faces of the gibs being V-shaped to form slide tracks for the beam arm 50, which, as will be seen, is provided with longitudinal V-grooves to cooperate with the gibs 48. Obviously, it is desirable to be able to clamp the beam arm 50 in any adjusted position and for this purpose, the hub 11 of the gear 12 is preferably bored out and screw threaded, as indicated in Fig. 12 of the drawings, and a knurled headed screw 51 is mounted therein, so that the lower end thereof may be brought into engagement with the beam arm 50 and clamp it by turning the knurled head.

In order to measure the length of the side A—B, of the triangle, it is preferable to provide means for measuring the movement of or indicating the relative position of the beam arm 50. In my improved instrument, this is preferably accomplished by mounting a rack 52 on the beam arm 50 and mounting a gear box 53 on the hub 11 of the gear segment 12. The gear box 53 is mounted above the overhanging bracket plate 6 and is secured to the hub 11, so as to rotate therewith. Thus means is provided for reading the angular position of the beam arm 50, as well as for reading its length. The gear box 53 may be secured to the hub 11 in any suitable manner, but, in the present instance the lower plate of the gear box is provided with a bored out and threaded boss 54, cooperating with threads on to the hub 11 and the gear box is secured in place, to rotate with the hub by a set screw 55. The gear box 53 is intended to carry intermediate gear mechanisms for operating direct reading registering means, whereby the length of the side A—B of the triangle, as represented by the beam arm 50, can be ascertained. Since the slide block 45—46 and beam arm 50 are mounted below the bracket plate 6, it is necessary to provide means for transmitting the movement of the beam arm to the gear mechanism in the gear box 53 and for this purpose, the rack 52 engages a pinion 56 mounted below the gear segment 12, as more particularly shown in Figs. 3, 12 and 13 of the drawings. The pinion 56 is secured to a shaft 57, the lower end of which is pivotally supported in a bracket 58, secured by screws 59 to the underside of the gear segment 12, as shown in Fig. 12 and indicated by dotted lines in Fig. 13. The shaft 57 passes upward through a hole 60 in each of the segments, 12, 13 of the angle quadrants and through a slot 61 in the bracket plate 6, as shown in Figs. 3 and 4 of the drawings. The slot 61 is arcuate and may be long enough to permit angular movement of approximately 90°. A gear 62 is secured to the upper end of the shaft 57, within the gear box 53, as shown in Figs. 2 and 12 of the drawings. The gear 62 meshes with a pinion 63 on a shaft 64, the latter being provided with a gear 65, secured thereto and meshing with a pinion 66 on a shaft 67. The shaft 67, as will be more particularly seen in Fig. 2 of the drawings, carries a bevel gear 68, which meshes with a bevel pinion 69, secured to the inner end of a shaft 70, operating a registering mechanism or counting device 71, which may be of any well known construction, embodying register wheels and tens transfer mechanism. The registering mechanism 71 is shown as mounted in a boss 72, extending from the gear box 53 and the registering mechanism may be held in place by a cap 73, which supports a thrust bearing 74, the construction being substantially similar to that previously described in connection with the register 30. A suitable cone bearing bracket 75 is preferably provided for supporting the inner end of the bevel shaft 70, as indicated in Fig. 2 of the drawings. The respective shafts 57, 64 and 67 are rotatably supported in the gear box 53, by suitable cone bearings 76 held in place in slotted bosses 77 by screws 78, as shown in Fig. 12 of the drawings.

Obviously, the beam arm 50 and rack 52 may be of any desired length, and the gear ratios may be selected to give numerical registrations on the registering devices 71 to to represent the length of the side A—B of the triangle in feet or inches, or any other system of dimensions selected. In the present instrument, and for the purpose of illustration, the gear ratios are so selected as to multiply the movement of the rack and beam arms 50 several hundred times. The length of the rack 52 is approximately 3.1416 inches, but stop screws 79 and 80 are inserted in the side of the beam arm 50, as shown in Fig. 5 of the drawings, so as to limt the movement of the beam arm to 3 inches. This movement is preferably multiplied to represent 3000 units on the register 71. It is understood that any suitable ratios of the intermediate gearing between the rack 52 and the register mechanism 71 may be selected and the multiplication of the movement of the beam arm 50 may be varied to give any desired readings, also the length of the beam arm 50 and rack 52 may be varied as desired. In the present instrument, the gear ratios selected are as follows:—The rack 52 and pinion 56 are 30 pitch and the latter has 30 teeth; the gear 62 is 48 pitch and has 100 teeth; the pinion 63 is 48 pitch and has 90 teeth; the gear 65 is 48 pitch and has 90 teeth; the pinion 66 with which gear 65 meshes has 12 teeth; the bevel gear 68 has 72 teeth and the bevel pinion 69 with which gear 68 meshes has 15 teeth. These ratios provide for ten units on the first wheel in the register mechanism 71, for each rotation of the bevel pinion 69 and shaft 70.

The train of gears between the rack 52 on the beam arm 50 and the registering mechanism 71 multiplies the motion of the beam arm to such an extent that, as with the previously described gear train, it is preferable to provide slow moving setting means for giving the final adjustment. For this purpose, a shaft 81 with a pinion 82 secured thereto, is provided with a knurled head 83, located above the upper plate of the gear box 53, as will be seen in Figs. 3 and 7 of the drawings and, as shown in Fig. 2, the pinion 82 is located in position to engage the gear 65, when the shaft 81 is pushed down by pressure on the knurled head, after which by manual rotation, the gear train can be moved for the final adjustment of the length of the side A—B of the triangle. The shaft 81 is slidably mounted in the gear box casing, substantially the same as that shown and described for the slow moving device 41. When the beam arm 50 is thus adjusted to the proper position, it may be secured against further movement by means of the clamping screws 51 hereinbefore referred to.

From the construction thus far described, it will be seen that the gear box 53 is united with the slide block 45—46 and gear segment 12—13, located below the bracket plate 6 and all are adapted to rotate in unison. The angle registering mechanism 30, operated by the gear segment 12—13, is adapted to indicate the angular position of the beam arm 50, while the length of the side A—B of the triangle, represented by the beam arm 50, is shown by the register 71 on the gear box 53. As previously stated, it is desirable to clamp these associated parts against angular displacement after they have been set for any particular angle and, in the present instrument, this is done by means of a set screw 84, threaded through a boss 85, on the lower plate of the gear box 53, as will be seen in Fig. 3 of the drawings. The screw 84 is provided with a knurled head 86, and the lower end thereof is adapted to engage the thickened portion 8 of the bracket 6 surrounding the pivot A.

Mounted upon the base plate 1 of the instrument, and preferably slidable thereon, is a carriage 87, which is adapted to support the pivot at the angle C of the triangle and render it adjustable toward and from the angle A to vary the length of the base line A—C of the triangle. For this purpose, two carriage track plates 88 and 89 (see Figs. 2 and 10) are mounted upon the base plate 1 and secured thereto in any suitable manner. The upper inner faces of the plates 88 and 89 are preferably provided with longitudinal V-grooves 90, forming ball-races. The carriage 87 comprises the top plate 91, from which depend gear box walls 92 and 93, to which are secured, respectively, ball-race track plates 94 and 95, provided with V-track grooves 96 between which and the ball-races 90, the balls 97 are mounted. A suitable ball spacer or spreader 98 is preferably employed.

It will be understood that it is desirable to determine the relative position of the carriage with respect to the base member in order to ascertain the length of the base line A—C of the triangle. In the instrument here illustrated, this is accomplished by mounting a rack 99 on the carriage supporting plate 89, as will be seen in Figs. 2 and 10 of the drawings, the rack being adapted to operate suitable registering means. The rack 99 preferably engages a gear 100 secured to a shaft 101, to which another similar gear 102 is secured. The upper gear 102 engages a pinion 103, secured to a shaft 104, to which is also secured a gear 105. The gear 105 engages a pinion 106 on a shaft 107 and the latter also carries a gear 108, engaging a pinion 109 on a shaft 110. The shaft 110 has, secured thereto, a bevel gear 111 meshing with a bevel pinion 112 mounted upon the inner end of a shaft 113 operating the units wheel of a registering or counting mechanism 114. The inner end of the shaft 113 may be supported by a cone bearing in a suitably mounted block 115, as indicated in Fig. 2 of the drawings.

The gear train just described is mounted between the top plate 91 of the carriage and a lower plate 116, secured to the depending side walls 92 and 93, as indicated in Fig. 10 of the drawings, thereby forming a gear box supported upon and movable with the carriage. The shafts 102, 104, 107 and 110 are preferably rotatably supported upon cone bearings 117 held in suitable split bosses 118 and 119, formed, respectively, on the lower plate 116 and top plate 91 of the carriage.

The level of the top plate 91 of the carriage, it will be seen, is below the level of the shelf 5, supporting the gear train for the angle A, and may slide under it, so as to bring the pivot centers A and C into vertical alignment. Since the base line A—C of the triangle is ordinarily longer than the other two sides, it is preferable that the carriage should have more movement than the beam arm 50. Therefore, the length of the rack 99 is accordingly greater and the gear ratios between the rack and the register 114 are preferably such that the register 114 may run to 6000 units. The length of the rack 99 in the present instrument is slightly more than 6 inches, but suitable stops may be provided for limiting the movement of the carriage to 6 inches. The gear ratios between the rack 99 and the registering mechanism 114 in the present instrument are as follows, although it will be understood that any suitable ratios between the gears and pinions may be employed. The rack 99 is 30 pitch and meshes with the gear 100, which is of 30 pitch and has 40 teeth; the gear 102, attached to the same shaft 101 has 65 teeth and is of 48 pitch; the pinion 103 is 48 pitch with 13 teeth; the gear 105 is 48 pitch with 44 teeth; the pinion 106 is 48 pitch with 12 teeth; the gear 108 is 48 pitch with 54 teeth; the pinion 109 is 48 pitch with 12 teeth; the bevel gear 111 has 50 teeth and the bevel pinion 112 has 15 teeth. As with the previously described registering mechanisms, the units register wheel of the register 114 is rotated ten units for each rotation of the bevel pinion shaft 113 and the carriage 87 may be adjusted to represent the length of the base line A—C of the triangle from zero up to the 6000 units on the register 114, and may be clamped in adjusted position by the thumb screw 87$^a$.

The carriage 87 forms the adjustable support for the pivot representing the angle C of the triangle, and registering means for reading the angle C, substantially similar to that described in connection with angle A, is mounted upon and supported by the carriage. This pivot C mechanism and the associated parts are more particularly shown in Figs. 6, 10 and 11. Referring more particularly to Fig. 11, it will be seen that the top plate 91 of the carriage is thickened at 120 and bored out to receive the outer annular shell 121 of the ball bearing pivot, the inner bearing ring 122 being forced on the hub 123 of a gear segment or quadrant 124, mounted below the top plate 91 and extending toward the right as viewed in Fig. 6 of the drawings. The gear segment 124 has, mounted thereon, a second similar segment 125, thereby forming a split segment substantially similar to the segment 12—13 previously described. The two sections 124 and 125 of the split segment are placed under tension by a spring 126, operating on a pin 127 in a radial cavity or slit 128, corresponding to the similar parts, shown and described in connection with the segment 12—13 and more particularly shown in Figs. 6 and 13.

The segment 124—125 operates a train of gears leading to a registering device, the ratios of which, in the instrument shown, are exactly the same as those described in connection with the segment 12—13 and the register 30. The gear segment 124—125 (Fig. 6) meshes with a pinion 129 on a shaft 130, which also carries a gear 131. A gear 131 meshes with a pinion 132 on a shaft 133, which carries a gear 134, meshing with a pinion 135 on a shaft 136. The shaft 136 also carries a bevel gear 137 which meshes with a bevel pinion 138, mounted on the inner end of a shaft 139, operatively connected with the units wheel of a registering or counting device 140, as will be seen in Fig. 6 of the drawings. As shown in Figs. 2 and 6 of the drawings, the registering devices 114 and 140 are mounted in a suitable bored out boss 141 mounted on the side wall 142 of the carriage and are held in place by a cover plate 142, which is provided with suitable thrust bearings 144 and 145 for the shafts of the respective registering device. The inner end of the pinion shaft 139 may be supported in a cone bearing in a block 146, as indicated in Fig. 2 of the drawings. The ratios of the gears and pinions between the segment 124—125 and the registering mechanism 140 are the same as those described in connection with the segment 12—13 and need not be repeated. A slow moving device for fine adjustment is provided in the pinion 147, which is mounted upon a shaft 148, provided with a knurled head 149, the construction and operation being similar to or the same as that shown and described in connection with the angle setting mechanism of the angle A and shown at 40 to 44 in Fig. 3 of the drawings. The shafts 130, 133 and 135 are rotatably supported between the top plate 91 of the carriage and the lower plate 116 thereof by suitable cone bearings 150, substantially similar to those previously described.

Similarly to the angle registering mechanism for the angle A the angle registering mechanism just described as mounted on the carriage is adapted to measure the angle C of the triangle and, in order that this may be accomplished, the gear segment 124—125 is adapted to be positioned by a beam arm 151 adapted to represent the side B—C of the triangle. For this purpose, and to provide means for measuring or registering the length of the side B—C, a slide block 152 and gear box 153 are mounted upon and secured to the hub 122 of the gear segment 124—125, as more particularly shown in Fig. 11 of the drawings. The upper end of the hub 122 is screw threaded and a boss 154, on the underside of the lower plate of the gear box and slide block, which are here shown as integral, may be screwed on to the hub and secured in place by means of a set screw 155. The slide block 152 is provided with V-shaped gibs 156, held in place by screws 157, the gibs cooperating with V-shaped tracks 158 in the beam arm 151. The beam arm may be clamped in any adjusted position by means of a knurled headed screw 159 mounted in the slide block 152, substantially as shown in Fig. 11 of the drawings. Similarly to the beam arm 50, the beam arm 151 is provided with a rack 160 (see Figs. 2 and 11) adapted to engage a gear or pinion 161, secured to a shaft 162, which also carries a gear 163 of substantially the same diameter. The gear 163 engages a pinion 164 secured to a shaft 165, which carries a gear 166 meshing with a pinion 167 on a shaft 168. A gear 169 is mounted on the shaft 168 and meshes with a pinion 170 on the shaft 171, the latter carrying a bevel gear 172 engaging a bevel pinion 173 mounted on a shaft 174 operatively connected with the units wheel of a register or counting mechanism 175, as more particularly shown in Fig. 2 of the drawings. The register or counting device 175 is mounted in a boss 176, which is bored out to receive it and is held in place by a cover cap 177, which supports a thrust bearing 178. The inner end of the shaft 174 is preferably supported by a suitable cone bearing in a block 179, which may be supported on the gear box in any suitable manner. The length of the rack 160 and the ratios of the gears between the rack and the registering device 175 are such as to provide for the registration of 3000 units, the same as for the beam arm 50. However, in the train of gearing here shown between the rack 160 and the register 175, the ratios are the same as those given for the train of gears between the rack 99 and the register 114. Therefore, the ratios need not be repeated. The shafts 162, 165 and 168 and 171 are rotatably supported in the gear box 153, by suitable cone bearings 180, previously described, as shown in Fig. 11 of the drawings.

Slow moving or final adjustment setting devices are provided for each of the similar trains of gears just referred to, namely the train of gears between the rack 99 and registering mechanisms 114 and between the rack 160 and the registering mechanism 175 and the parts are given the same reference numerals. All of the devices, in the instrument shown, for fine adjustment or slow movement of the gear trains are exactly similar and the construction has been previously described, the corresponding parts of the first one described being numbered 40 to 44 and shown in Fig. 3 of the drawings. In the two trains of gears just referred to, the corresponding gears 169 and 108 are adapted to be engaged respectively by a pinion 181 mounted on a shaft 182, carrying a knurled head 183 and the shaft is held in its upper position by a spring 184, so that the pinion 181 is normally out of engagement as shown in Figs. 3 and 11 of the drawings.

By means of the mechanisms just described, as associated with the pivot C, it will be seen that the relative position of the beam arm 151 will be shown on the register 175, while its angle with respect to the base line A—C of the triangle will be shown on the register 140. As with the angle registering device at the angle A of the triangle, it is desirable to provide means for clamping the angle at C when so desired and for this purpose any suitable clamping device may be employed. In the present instance, however, a screw 185, provided with a knurled head, is threaded through the lower plate of the gear box 153, as shown in Figs. 2, 3 and 10, the lower end of the screw is adapted to engage the top plate 91 of the carriage and thereby clamp the slide block and gear segment 124—125 in any adjusted position. The length of the rack 160 may be slightly more than 3 inches, or substantially the same length as the rack 52 on the beam arm 50 and similar stops 186 and 187 are preferably mounted at the ends of the beam arm 151, as shown in Figs. 2 and 5 of the drawings, to limit the movement thereof in the slide block 152, to the registration of 3000 units on the register 175.

The beam arms 50 and 151 are adapted to be secured together in the form of an elbow joint at the angle B of the triangle, substantially as shown in the drawings, and particularly in Figs. 1, 2 and 5 thereof. The beam arm 151 is located below the plane of the beam arm 50, so that one will fold under the other when the carriage 87 is moved to zero position. The two beam arms 50 and 151 are secured together at the angle of intersection thereof by a pivot stud 188, which is preferably secured to the beam arm 151 while the beam arm 50 is adapted to rotate thereon. Obviously, the angle between the beam arms 50 and 151 may be varied between zero and 180° and it is desirable to provide means for clamping the beam arms against further movement when they have been adjusted to any required angle. For this purpose, as will be seen in section in Fig. 5 of the drawings, the end of the beam arm 50 is bored out and threaded and a clamping screw 189 is inserted therein and adapted to be turned down by a knurled head 190, so as to engage the pivot stud 188 and clamp the beam arms in any angular adjustment. Since right angled triangles are more easy of solution and require fewer measurements and less data, surveyors, engineers and technical men use the right triangle more frequently than any other. Therefore, it is preferable to provide means for positively locking the beam arms 50 and 151 together when the angle is 90°. For this purpose the screw 189 is bored out and threaded and another knurled headed screw 191 is inserted therein and provided with a conical or other suitable point 192, adapted to be seated in a socket 193 in the pivot stud 188 and lock the beam arms at an angle of 90°.

It will be understood that in instruments of this character, where the gear ratios are such that the motion of the initial racks is multiplied several hundred times by the time it reaches the registering mechanism or counting device, lost motion in the gears is apt to result in an error in the reading, either by underthrow or overthrow of the fast moving gears. It is essential, therefore, to provide some suitable means for preventing backlash or overthrow in the gear train, in order that the readings may be relied upon, for otherwise the results will be unsatisfactory and inaccurate. Therefore, in the present instrument, all of the larger gears in the gear trains, as well as in the gear segments 12—13 and 124—125 are mounted as split gears for taking up backlash or lost motion and adapted to mesh with solid faced pinions or racks as the case may be.

The preferred construction for the split gears in the several gear trains is more particularly shown in Figs. 8 and 9 of the drawings, in which it will be seen that the lower section 194 of the split gear is provided with an annular recess at 195, and a hub 196 whereby the gear may be secured to the shaft 197 in any suitable manner. The hub 196 is provided with a ledge upon which the loose section 198 of the split gear is rotatably mounted. The upper section 198 is preferably also provided with an annular recess 199, the two recesses 195 and 199 forming an annular spring box in which a coiled watch spring 200 is mounted. As will be seen in Figs. 8 and 9 of the drawings, the inner end of the spring 200 is secured to the lower section 194 of the split gear by means of a hook 201, and the outer end of the spring is secured to the upper section 198 by means of a hook 202. The two sections are preferably held together so that the upper section may be rotated by means of the spring by suitable screws 203, the heads of which overlap the outer face of the upper section 198. The advantage of providing the long coiled watch spring is that the tension of the spring may be readily adjusted by rotating the upper section 198 on the lower section 194 until the necessary tension is provided and then the split gear is placed in mesh with its pinion, which, as previously explained, is solid faced. The long watch spring construction in the split gear also gives a more uniform tension and permits closer adjustment than could be obtained by a short spring or the ordinary helical spring, and as a manufacturing proposition, will give more reliable results for the tension of the several split gears can be more uniformly duplicated after the proper tension has been secured, according to the load to be carried by the gears.

It will not be necessary to point out all of the split gears of this type that are incorporated in the present instrument, for they are indicated on the drawings and it will be understood that, except where they mesh with racks, the split gears alternate with solid faced pinions or gears. The split backlash gears in the trains of intermediate gears between the several racks and the registering device are sufficient in number and arrangement to take up all the backlash or lost motion and the tensions of the respective springs in the split gears are so adjusted as to carry the load, according to their positions in the trains, and with the type of spring used the proper tension can be obtained without undue friction so as not to interfere with the free action of the gears.

The operation of my improved instrument is comparatively simple, for the operator has nothing to do but set up the known factors or elements of the triangle and read off on the corresponding registering devices the numerals representing the other factors or elements. If the triangle to be solved is a right triangle, as would ordinarily be the case, the beam arms 50 and 151 are secured together at an angle of 90° by means of the knurled screw 191, while all of the other locking screws or devices are temporarily released. If, for example, as shown on the instrument in Figs. 1 and 2 of the drawings, the right triangle to be solved has the base line or hypothenuse given as 4000 feet, inches, metres or other unit of measure and the adjacent angle A is given as 45° or 2700 minutes, the beam arms 50 and 151 being locked together at an angle of 90° may be adjusted in their respective slide blocks while the carriage 87 is moved along the base member, until 4000, representing the side A—C of the triangle, is shown on the register 114. The final adjustment of the carriage, to bring the numerals 4000 into position, may be made by pressing down the knurled head 183 and meshing the pinion 182 with the gear 108, after which, by turning the knurled head 183, the final adjustment can be secured. The beam arms 50 and 151 may then be further adjusted until the register 30, for the angle A, shows 2700 minutes or 45°, representing the given angle in addition to the known angle of 90° at B. The slide block 45, gear box 53 and associated parts at the angle A may then be clamped in position by the clamping screw 84, and the triangle is solved. The other clamping screws such as 51, and 159 and 185 may then be clamped if it is desired to preserve the several registrations against any further movement or accidental displacement. The lengths of the sides A—B and B—C, as determined by the beam arms 50 and 151, may then be read from the respective registering devices 71 and 175. In the example given, the sides A—B and B—C of the triangle will be of the same length, that is 2828 units, as shown by the registers in Fig. 2 of the drawings. The angle C may now be read from the register device 140 which shows 2700 minutes or 45°.

Obviously, other right triangles, in which the angles A and C are not equal, as the example given, may be readily solved on the instrument, by substantially the same steps in the manipulation thereof, and other triangles in which the included angles B, between the sides A—B and B—C, is other than a right angle may be readily solved when two angles and one side or two sides and one angle or known and the angle B obtained by subtracting the sum of the angles A and C from 180.

While I have shown and described my improved instrument in the preferred form, which I have found to operate satisfactorily in practice, it will be understood that it represents only one form of the device and that various modifications in the specific details of construction may be made without departing from the spirit and scope of the invention. For instance, it will be understood that instead of the registering devices shown I may use other forms of registering devices adapted to indicate the lengths of the respective sides of the triangle and the angles thereof, such as the type of registering device used in water and gas meters or those used on other well known forms of counting devices. Furthermore, it will be understood that the gear ratios may be varied and the register devices may be so constructed as to indicate degrees and minutes for the angles and feet and inches for the lengths of the sides or the readings may be according to any selected units of measure. It will be also understood that the lengths of the beam arms may be increased and if desired or several different lengths of beam arms may be supplied and interchangeably used in connection with the instrument and the amount of sliding movement permitted the carriage may be varied, or its position with respect to the pivot at the angle A may be extended by lengthening the base member, and various other modifications may be made by those skilled in the art to meet various requirements; therefore, the claims herewith presented are not limited to the specific construction shown and described.

I claim:—

1. A triangle calculating instrument, comprising a base member, a slidable carriage associated therewith and adapted to be positioned to represent one side of the triangle, gearing connections between the base member and the carriage, and registering means associated with said gearing for direct reading of the side of the triangle thus represented.

2. A triangle calculating instrument comprising a base member, a slidable carriage associated therewith and provided with register means for direct reading of the relative movement of said carriage, said register displaying numerals representing the length of one side of the triangle, a pair of floating slide beams pivoted together at their angle of intersection and adapted to represent the two other sides of the triangle, and registering means associated with each of said beams for direct reading of the respective lengths of the two sides of the triangle represented thereby.

3. The triangle calculating instrument as claimed in claim 2, in which registering means with suitable numerals is provided for directly reading the angles made by the respective floating beams with the other side of the triangle represented by the relative movement between said carriage and base member.

4. A triangle calculating instrument, comprising a base member, means associated therewith for direct reading registration of the length of the base side of a triangle, a pair of floating beams pivoted together to form the angle opposite said base side, for presenting the two other sides of the triangle, slide blocks in which the free ends of the respective beams are adapted to slide, and register mechanism associated with each of said slide blocks and operated by the respective beams for displaying numerals representing the amount of movement of the respective beams and hence the relative lengths of said two other sides of the triangle.

5. The triangle calculating instrument as claimed in claim 4, in which each of said slide blocks is geared to registering devices displaying numerals giving a direct reading of the angular positions of the respective beams, relative to the other or base side of the triangle.

6. A triangle calculating instrument, comprising a base member, a pivot support fixed to said base member, a carriage slidably mounted on said base member, a pivot support on said carriage, a pair of pivotally united beam arms having their free ends slidably mounted in slide blocks pivotally supported respectively on said fixed support and said carriage, and registering devices mounted on said slide blocks for indicating the effective lengths of the respective beam arms.

7. The triangle calculating instrument as claimed in claim 6, in which each of said slide blocks is geared to registering mechanism showing the numerical value of the angles between the respective beam arms and a line between said pivots.

8. A triangle calculating instrument, comprising a base member, a fixed support thereon provided with means representing angle A of a triangle, a movable member slidably mounted on said base member and carrying means representing angle C of said triangle, the line between said means representing the side A—C of the triangle, and registering means operatively connected between said movable member and said base member for indicating the relative movement therebetween and giving a direct reading of the length of the side A—C of the triangle.

9. A triangle calculating instrument, comprising a base member, a carriage slidably mounted thereon and adapted to be positioned to represent the length of one side of the triangle, a rack on said base member, a denominational registering device on said carriage, and intermediate gear connections between said registering device and said rack, whereby the registering device is adapted to be operated when said carriage is moved, thereby displaying numerals representing the length of said side of the triangle.

10. A triangle calculating instrument, comprising three gear racks, adjustable relative to each other to represent the three sides of the triangle to be solved, register mechanism operatively geared to the respective racks, said register mechanism being adapted to display numerals representing the lengths of the respective sides of the triangle, and register mechanism operatively adjustable with said racks for giving two of the angles therebetween.

11. A triangle calculating instrument comprising a pair of beam arms pivotally connected together in the form of an elbow, pivoted members provided with slide ways, in which the free ends of said beam arms are adapted to slide, a gear segment secured to each of said pivoted members and registering devices operative by said gear segments for indicating the respective angular positions of said beam arms.

12. In a triangle calculating instrument, the combination with means for representing the respective sides of a triangle, of means associated with two of said side representing means for angular movement according to the respective angles thereof with the other side of the triangle, and registering means cooperating respectively with each of said side and angle means for direct reading of the lengths of said sides and the values of said angles.

13. In a triangle calculating instrument, the combination with a gear rack, of a registering device operatively geared to said rack, for displaying numerals representing relative movement between the registering device and rack, and a pinion normally out of engagement but adapted to be brought into engagement with said gearing and manually operated for final setting and close adjustment between the registering mechanism and said rack.

14. In a triangle calculating instrument, the combination with a base member of, a slide block pivotally supported in fixed position upon said base member; a second slide block pivotally supported on a member adjustable along said base member to vary the distance between said pivots, a beam arm slidably mounted in each of said slide blocks, said beam arms being in different planes so that their outer ends may overlap, means for pivotally securing the outer ends of said beams together for relative angular movement when said pivotally mounted slide blocks are moved apart and means for clamping said beam arms together for preventing angular adjustment thereof.

15. In a triangle calculating instrument, the combination with a base member, of a slide block rotatably supported on said base member, registering mechanism geared to said slide block for giving direct readings of the angular position thereof, and means for clamping said slide block and gear mechanism against angular adjustment thereof.

16. In a triangle calculating instrument, the combination with a base member, of a slide block rotatably mounted thereon, a beam arm slidably adjustable in said block for representing the length of one side of a triangle, means for clamping said beam arm in the slide block in any adjusted position, registering means geared to said block for displaying numerals representing the angular position of said slide block and beam, and means for clamping said slide block against angular movement.

17. In a triangle calculating instrument, the combination with a base member, of a slide block rotatably mounted in fixed position on said base member, a carriage mounted to slide on said base member, a slide block rotatably mounted on said carriage, beam arms slidably mounted in said slide blocks, a pivot connecting said beam arms together in the form of an elbow, the angle between said arms being adapted to be varied according to the position of said carriage on the base member, means for clamping said beam arms against movement at the elbow joint, means for clamping said beam arms against movement in their respective slide blocks, and means for clamping said carriage against relative adjustment on said base member.

18. In a triangle calculating instrument, the combination with a base member, of a bracket mounted thereon, an angle registering device supported on said bracket, a carriage slidably mounted on said base member and an angle registering mechanism mounted on said carriage, the arrangement being such that said registering devices are at different levels and said carriage is adapted to slide under said bracket.

19. In a triangle calculating instrument, the combination with a base member, of a carriage slidably mounted thereon, said carriage being provided with a top plate, a gear box formed upon and below said top plate for supporting registering mechanism, and a rack mounted on said base member for actuating said registering mechanism to register and indicate the relative movement of the carriage on said base.

20. In a triangle calculating instrument, the combination with a base member, of an overhanging bracket mounted thereon, a casing on said bracket enclosing and supporting the gearing of angle registering means, a slide block mounted for rotation in said overhanging bracket, said block being located and supported below the bracket, a gear box containing registering mechanism located above said bracket and secured to said block to rotate therewith, a beam arm, representing one side of a triangle, slidably mounted in said block, and gear connections between said beam arm and the registering mechanism in said gear box for transmitting motion of said beam arm to said registering mechanism, the latter showing the length of the side of the triangle represented by said beam arm.

21. In a triangle calculating instrument, the combination with a base member, of a carriage slidably mounted thereon, said carriage being provided with a top plate, a slide block rotatably supported by said top plate, said slide block being located above the top plate, a gear segment located below said top plate and connected for rotation with said slide block, angle registering means connected with said segment and mounted in a gear box on the under side of said top plate, a gear box enclosing registering means secured to said slide block and rotatable therewith above said top plate, and a beam arm slidably mounted in said slide block and provided with a rack for actuating said last mentioned registering means for indicating the length of the side of the triangle represented by said beam arm.

22. In a triangle calculating instrument, the combination with a base member, provided with an overhanging bracket, of a carriage mounted on said base member and slidable under said bracket, a pair of rotatable slide blocks mounted respectively upon said bracket and upon said carriage, each slide block cooperating with angle registering means, a pair of beam arms pivoted together at their outer ends and slidable respectively in said slide blocks on said bracket and carriage, said beams being located one above the other between said overhanging bracket and the carriage, so that when said carriage slides under said bracket, the beams will be nested and folded one over the other, above said carriage and below said bracket.

OSCAR R. TURNER.